United States Patent [19]

King

[11] Patent Number: 4,751,002
[45] Date of Patent: Jun. 14, 1988

[54] CABLE SUPPORTED RAKE ARM THICKENER

[75] Inventor: Donald L. King, Bountiful, Utah

[73] Assignee: Baker International Corporation, Salt Lake City, Utah

[21] Appl. No.: 8,520

[22] Filed: Jan. 29, 1987

[51] Int. Cl.⁴ .............................................. B01D 21/06
[52] U.S. Cl. ..................................... 210/530; 210/531
[58] Field of Search .............................. 210/523–525, 210/527, 528, 530, 531

[56] References Cited

U.S. PATENT DOCUMENTS

| | | | |
|---|---|---|---|
| 3,295,835 | 1/1967 | Klopper | 210/528 |
| 3,627,132 | 12/1971 | Kelly et al. | 210/525 |
| 3,959,152 | 5/1976 | Seifert et al. | 210/531 |
| 4,000,075 | 12/1976 | Wooh | 210/525 |
| 4,462,908 | 7/1984 | Eichler et al. | 210/531 |

FOREIGN PATENT DOCUMENTS 56-15287 4/1981 Japan ................................. 210/525

*Primary Examiner*—Richard V. Fisher
*Assistant Examiner*—Richard D. Jordan
*Attorney, Agent, or Firm*—Thomas S. MacDonald; Alan H. MacPherson; Carl A. Rowold

[57] ABSTRACT

Support of rake arms in a thickener is by sets of separate support cables and separate torque cables extending from outboard-of-the-center positions of rotating trusses extending radially of the sedimentation tank. The sets of support cables are attached in a vertical plane between spaced positions on a common point on the trusses to spaced radial positions along inner hinged rake arms so that the entire weight of the arms is taken up by the support cables. Torque cables extend from a single point on a truss generally midway of the truss but at a radially offset position from the center line of containing the support cable attachments on the truss or multiple trusses. The torquing or pulling action of the torque cables, also produces no thrust load along the rake arms. This eliminates the need of a heavy large center structure adjacent the rake arm hinges to absorb a rake arm thrust load against the hinges. The hinges are supported by relatively thin posts extending from the rotating trusses. Thus there is no large central structural members with scale build-up impeding the flow of settled material to the central sludge withdrawal outlet. Scale clean-up is reduced in magnitude and frequency due to a much reduced amount of structural steel and structure.

15 Claims, 3 Drawing Sheets

CABLE SUPPORTED RAKE ARM THICKENER

BACKGROUND OF THE INVENTION

1. Field of the Invention

This invention relates to cable supported and cable pulled raking arms for sedimentation thickeners, more particularly, the invention is directed to thickeners of the traction-type or center drive type, with a rake support and cabling system which eliminates the need for a thickener center structure capable of resisting large thrust forces.

2. Material Information

Thickeners or settling apparatus have been used for decades for solids-liquid separation of slimes, slurries and sludges. Generally this apparatus includes a relatively large settling tank and rotary rakes supported within the tank and which are driven to move settled material to a central area of the tank bottom. Support and driving force has been previously provided by systems of cable supports and cables for torquing or moving the rakes around the tank bottom.

U.S Pat. No. 3,295,835 shows a typical arrangement in which the rakes are supported by cables attached between the outer ends of torque drive arms and to various positions along rake carrier arms and where the drive arms and rake arms are radially displaced from each other. The cables both support and torque the rake carrier arms. The vertical component of the torque force must equal the weight of the rake arm before the arm can be lifted. Particularly when the rake arms become encrusted with heavy mud or scale any difference between that vertical component and the total weight of the rake arm and scale must be carried by the rake arm itself resulting in an inner thrust at the hinge joint and the necessity for sufficient reaction structure to absorb that thrust.

U.S. Pat. No. 3,833,126 illustrates a central vertical torque-tube or column having booms extending therefrom with pulling cables extending from spaced positions on the rake arms to an outboard position on each boom. Flexible cables extending from the center shaft or cage to the spaced positions on the rake support the rake structure. This is the so-called Swing-Lift thickener in which two torque arms extend from a rotating shaft or cage having multiple torque cables extending from the outboard end of the torque arms to spaced positions on the rake arms and support cables extending from the center cage to those same positions.

U.S. Pat. No. 3,959,152 discloses a somewhat similar cabling arrangement except that the respective sets of rake-drive and rake-support cables are attached to a traction-driven rotary drive arm of girder-type construction extending from an outer tank edge to a center column structure.

Each of the above prior art constructions particularly after scale being encountered are characterized by a cable support force which results in a thrust load in the rake arm(s) which is opposite to the cable support. Due to the requirement, as expressed in the above patents, of having the rake arms hinged so as to lift when they encounter an excess load of settled material being raked, a hinge is provided at the inboard end of the rake arms. A reaction force provided by heavy structure must be provided at the hinge to absorb the heavy thrust load inwardly along the rake arms. This thrust load and required reaction force is illustrated in Applicant's FIG. 1 prior art schematic drawing where a series of support cables provide an inward cable force which in turn creates a thrust load which must be absorbed by a relatively heavy and complex center structure or cage at the hinge point. Such structure is not only expensive but due to its size and construction can become scale encrusted so that it encroaches upon the central underflow withdrawal inlets in the tank bottom which receive the raked settled material. Scale clean-up becomes a large, more frequent job due to the amount of steel and structure needed to absorb the rake arms heavy thrust loads.

SUMMARY OF THE INVENTION

A particular problem due to the accumulation of scale on structure under the liquid level has occurred in thickener operations involving the thickening of "red mud" in alumina refineries. In such operations a mass of red mud moves circumferentially with the rake arms and also radially inward toward center discharge from the settling tank. In designing a new installation it was evident that the rake arms and their drive means must present minimum surface area both to resistance of the structure through the mud and for scale build-up on that structure. This dictated a preferred structure involving a cable torque design. However, it was also evident that the required structure to absorb the end load reaction of the rake arms at the center column would be so massive as to likely inhibit underflow movement of the mud to its withdrawal point. For example, calculations showed that an 8-inch diameter solid steel rake arm would be needed to take and resist scale load and the torque loading and a 72-inch diameter pipe ring surrounding a caisson type column would be necessary to support the hinges and absorb the thrust at each of the inner ends of the rake arms. The mere size of these structures and their close clearance to the center column would have been clearly obstructive of flow of mud to the mud outlet, particularly due to the need of having the rake inner end hinged and a hinge reaction force structure close to the outlet. In use it was also anticipated that scale and built-up mud would accumulate and block mud flow from the rakes to the mud outlet. In the installation under consideration, a torque of 10,000,000 ft-lbs was contemplated in a 90 meter diameter thickener. It was then realized that a way should be found to simplify and lessen the amount of thrust absorbing structure at the inner ends of the rake arms. It was then thought that if one could eliminate the thrust load in the rake arms that one essentially could eliminate the need for a large central structure capable of resisting the large thrust forces. This was accomplished by providing a support point for the raking arm which is radially displaced from the torquing point on the drive arm that had been employed by applicant and others previously and as illustrated in the mentioned prior art patents.

This invention provides for having cable supports extend in essentially a vertical plane from a linear line of points or a substantially common point on a rotating truss positioned above the liquid level and extending at least partially across the tank diameter. In the common point embodiment, that common point is approximately halfway of a radius between the tank center point and the tank outer periphery such that no thrust load results along the raking arm from the support cables. Vertical support cables may also extend from spaced positions on the truss to spaced positions along the length of the rake arm so that the rake arm weight is essentially equal and opposite to the cable support load resulting in no thrust in the rake arm. Absence of a thrust load eliminates the need of a bottom center structure capable of absorbing a heavy thrust load. Concurrently, the rake arms in operation are subject to pulling forces by torquing cables attached to the drive arm(s). The torquing cables are attached also along the length of the rake arms but extend angularly upward to a lateral extension on an associated drive arm, such that the common point attachment of the torque cables is displaced on a preceding radian. The torque cables are also attached to the rake arms so that no thrust load is transferred to the hinge point. It is desired that the rake arms be hinged so they may be lifted as rake arm torquing forces increase beyond a set level. A simple support is still needed to position the arm hinge and resist the upward reaction of the hinged end of the arm due to the pull of the torque cables.

As a result of this new construction no center cage is required to absorb rake arm thrust and thus there is little resistance to underflow withdrawal due to scale encrustation and any scale which forms on the hinge and its simple support structure is of a much less magnitude and clean-up is reduced in frequency.

DETAILED DESCRIPTION

Figure 1:
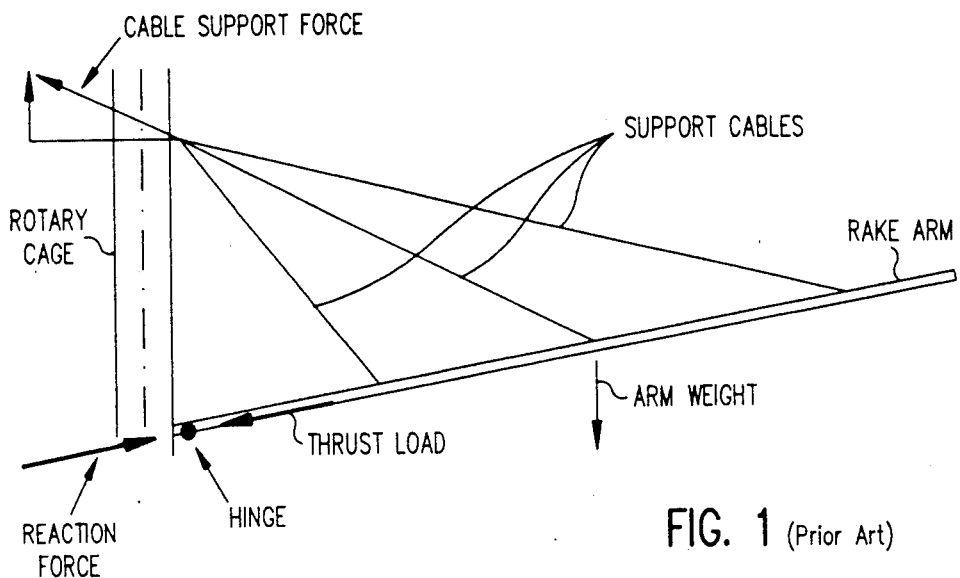
FIG. 1 is a partial schematic side view of a prior art rake and drive means showing an inner thrust load at the arm hinge as a result of the position of the support cables.
Figure 2:
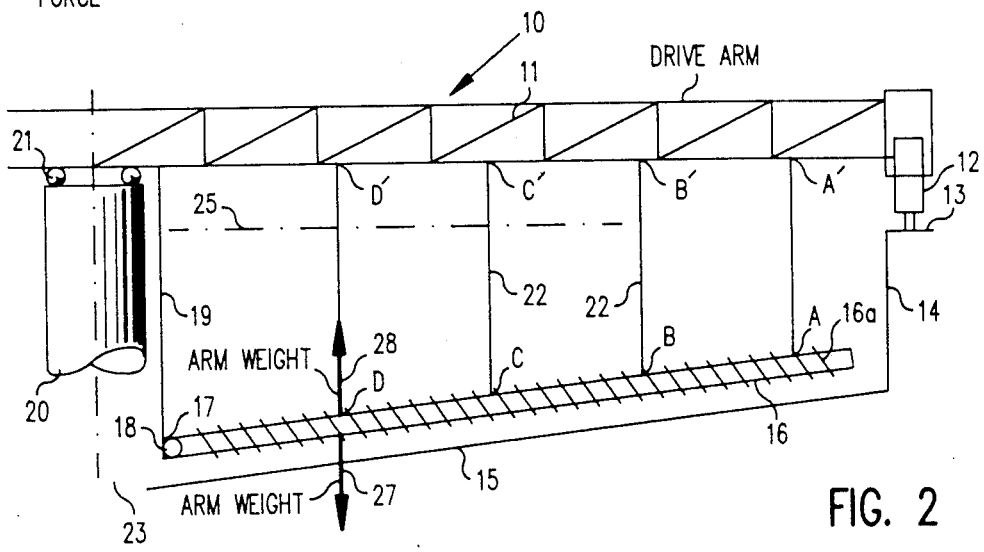
FIG. 2 is a partial schematic side view of a traction-driven truss supporting a rotary rake arm without inner thrust loads at the arm hinge.
Figure 5:
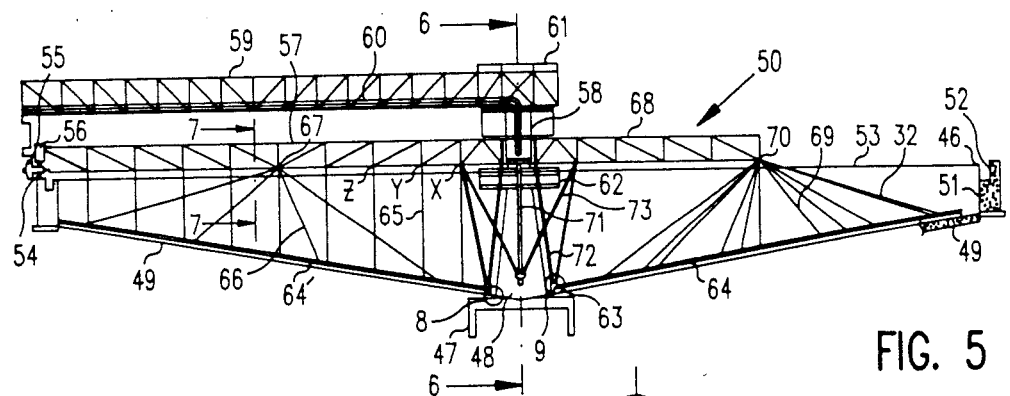
FIG. 5 is an elevational view of a general arrangement of an overall traction drive thickener embodying the invention.

FIG. 2 schematically illustrates one-half of a thickener 10 which includes a moving full length (extending over a full radius of the tank) drive arm or truss 11 rotated by a conventional traction drive 12 positioned at a peripheral edge 13 of a cylindrical metal or concrete sedimentation tank wall 14. Tank 14 normally has a tank bottom or floor 15 sloping downwardly from the periphery to a sludge withdrawal outlet 23 at the tank center. A rake arm 16 with rake plates 16a attached thereto is positioned slightly above and generally parallel to the floor slope and is rotatable by torque cables extending from a truss extension (FIGS. 7-8) so as to move settled material from the tank floor to the sludge withdrawal outlet. The inner ends 17 of the rake arms are connected to hinges 18 supported by the bottom ends of central support posts 19 extending downwardly from the truss 11. Rake arm 16 is supported at spaced points A, B, C, D along its length by vertical cables connected at spaced points A', B', C', D', along the truss which extends directly above the arm on the same radian as the arm, i.e., all the aforesaid points are in an essentially vertical radial plane. The support points on the rake arms 16 are the same in location and number as the support points on the truss drive arms 11. The overall rake arm weight (including any scale or mud accumulated on the rakes and rake arm) represented by arrow 27 is equal to and opposite to the cable support load represented by arrow 28 resulting in no end thrust at the inner end 17 of the rake arm. The only structure slightly impeding flow of settled material to the withdrawal outlet is the end of the relatively small-in-cross section rake arm, the hinge, and the relatively small diameter, e.g. 12-inch diameter hinge support posts and any needed stabilizing cables or tie rods (FIG. 5). A liquid level shown by dash line 25 is situated within tank 14. A fixed cylindrical or conical column 20 on which is mounted a thrust bearing 21 supports the rotary drive arm 11 at its center.

Figure 3:
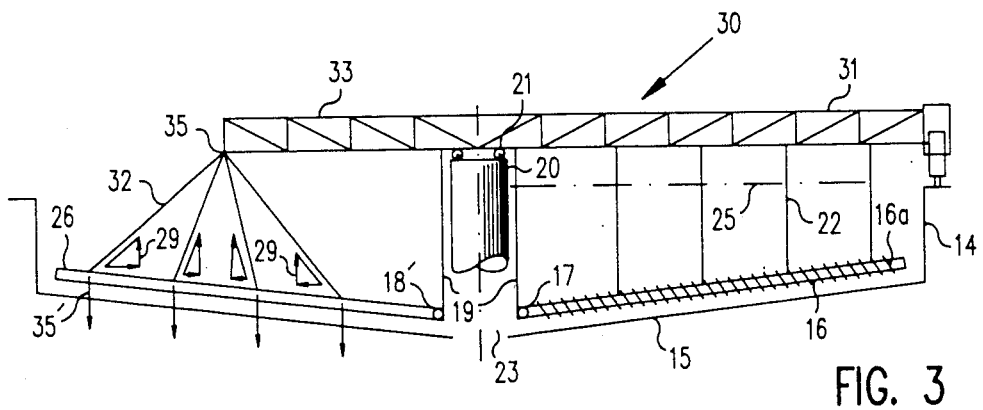
FIG. 3 is a schematic side view of a thickener showing various embodiments of support cables without thrust loads on the inner ends of the rake arms.

FIG. 3 illustrates a traction type thickener drive arm 30 having the vertical support cables 22 extending from a full radial length truss 31 and a half-length auxiliary truss 33. The latter supports a rake arm 26 by providing a series of vertical cables 32 in a vertical plane and connected at their top ends to a common point 35 adjacent an end of truss 33 and at their bottom ends to spaced points along the length of rake arm 26. The cable loads 29 (from the arm weight arrows 35) place the thrust load to the center of the rake arm with the result that there is no end thrust by the rake arm at the hinge 18'.

Figure 4:
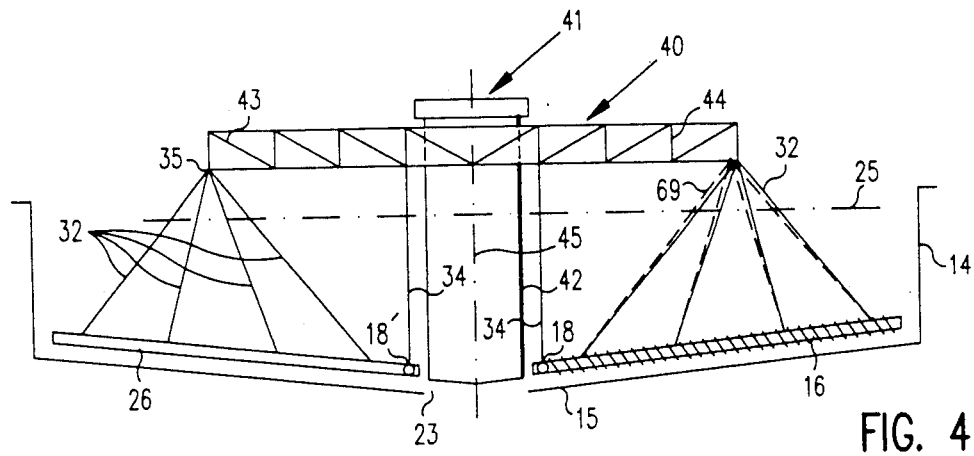
FIG. 4 is a schematic side view of a center drive embodiment with support and torque cables extending from common points on a rotary truss.
Figure 7:
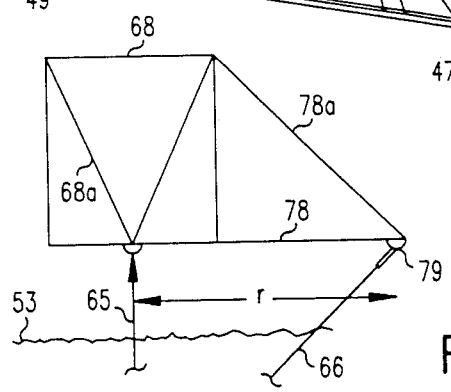
FIG. 7 is a sectional end view taken on line 7—7 of FIG. 5 showing the lateral extension on the drive truss arm for mounting the torque cables.
Figure 8:
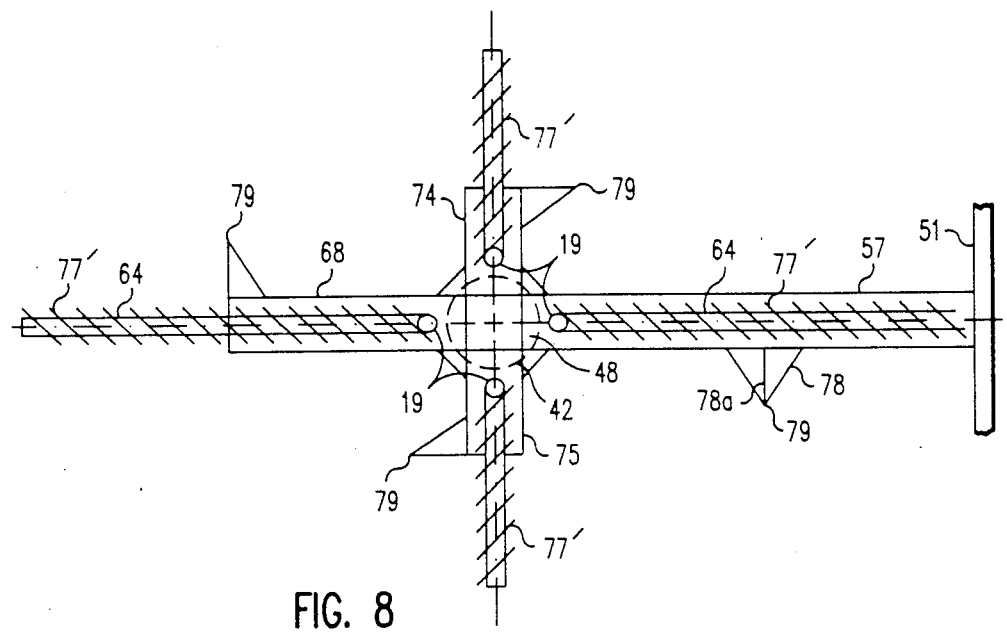
FIG. 8 is a plan view of multiple truss drive arms for vertical attachment of support cables and angular attachment of torque cables from a truss extension.

FIG. 4 shows thickener driving arms 40 where the truss and rakes are powered by a center drive 41 supported by a central column 42. Drive 41 rotates connected short trusses 43 and 44 about center line 45 with sets of cables 32 supporting rakes 16 and 26 as explained with respect to the left side of FIG. 3. In addition, a lateral truss extension such as shown in FIG. 8 extends from truss 44 in the direction of rotary movement and a common mounting point shackle provided at the extension end to mount the upper ends of torquing cables 69 extending angularly from the shackle to the rake arm. The torque cables are shown by dash lines. In a typical application the shackle end of the extension is positioned at a point from 15° to 25° of arc from the radial line of the radial truss 44, i.e., the arc subtended by cables 65, 66 connected to the truss and the extension at a distance apart (FIG. 7).

FIG. 5 shows an overall thickener 50 having a concrete side wall 51 with clear liquor overflow launder 52. Sloping floor 49 leads to a central sludge withdrawal outlet 48 and outlet pipes 47 connected to a suitable sludge withdrawal pump (not shown). Excess clear liquid at level 53 is permitted to overflow over a peripheral wire 46 into launder 52 as is conventional. A traction drive wheel 54 driven by motor 55 provides a driving tractor 56 rotating truss 57 around a central mechanical bearing assembly 58. A fixed access bridge 59 is provided for operator access to a central enclosure 61 for the bearing assembly. A feed pipe 60 for the liquid-solids slurry to be thickened or settled is mounted on the bridge 59. Feed pipe 60 empties into a circular feed well and distributor 62 just below the liquid level 53.

A short truss 68 which saves the cost of additional steel may extend approximately halfway across the radius from the thickener center, where it is connected to truss 57, to the thickener peripheral edge. At a point 70 approximate the outer end of truss 68 a series of support cables 32 are mounted which extend in a vertical plane to spaced connection positions along the length of rake arm 64. The cables and their rake arm connections are spaced so that no inward thrust results from the support of the rake arm by the rotary truss. The full length truss 57 (a tank radius in length) has depending vertical cables 65 attached at points X, Y, Z, etc., which correspond to similar points of connection of the cables 65 in a vertical plane to rake arm 64'.

Figure 9:
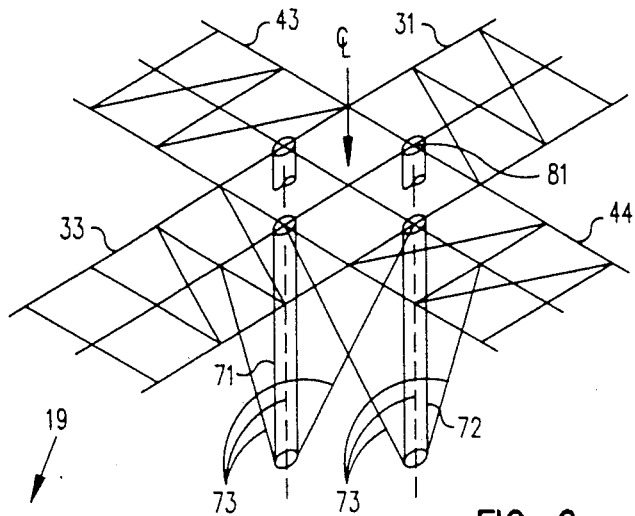
FIG. 9 is an isometric illustration of support posts for the arm hinge showing attachment to drive trusses and cables (or tie rods) for stabilizing the posts.
Figure 10:
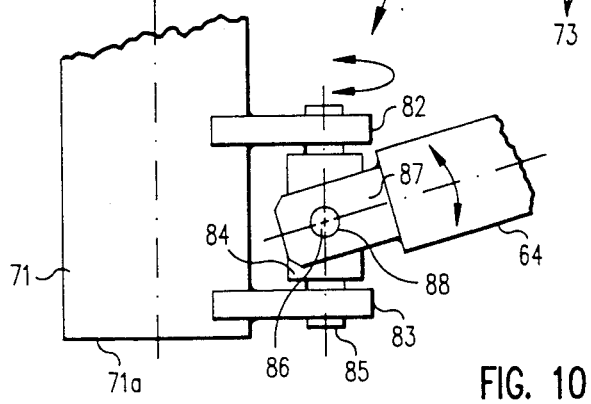
FIG. 10 is a detailed side view of a hinge and hinge support post interconnection.

Details 8 and 9 in FIG. 5 show the hinge assembly and hinge post support mounting, respectively, and are detailed in FIGS. 9 and 10. A series of support posts 71, 72, for example mounted 180°, 120°, or 90° apart, extend above each hinge 63 at the inner end of each rake arm. Cables or other cross tie rods 73 stabilize posts 71, 72. The posts and cables or cross tie rods are connected at their upper ends to trusses 57, 68 as illustrated. It is thus seen that the posts and cross tie rods leave a very open and thin steel construction, scaling of which will cause little obstruction to the flow of settled mud or other material from the tank floor to the withdrawal outlet.

Figure 6:
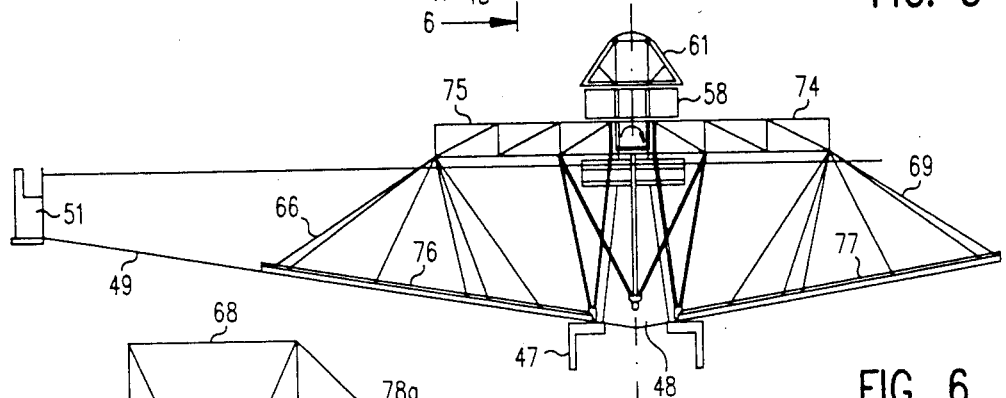
FIG. 6 is an elevational view taken on the line 6—6 of FIG. 5 of short trusses mounting support and torque transmitting cables between the rake arm and truss structure within a tank.

FIG. 6 shows a pair of short trusses 74, 75 which are positioned 90° from trusses 57, 68 in FIG. 5. Trusses 74, 75 suport additional hinged short rake arms 76, 77 which aid in moving an increased amount of settled material in the inner regions of the tank bottom which have been moved from the outer regions by action of rakes 64, 64'. In FIG. 6 only torque cables 66, 69 are shown, which extend angularly (not in a vertical plane) from truss lateral extensions at the ends of the trusses. It is to be understood that support cables extending in a vertical plane may be provided between the truss ends and spaced positions on the rake arms so that neither the torque cables or separate cables permit an inner end rake arm thrust to impact the inner hinge connections.

FIG. 7 is an end view of truss 68 showing an extension 78 extending laterally upstream of the advancing truss and associated rake arm. A truss arm 78a supports the extension. A shackle 79 is attached at the bottom end of the extension arm and the torque cable(s) attached thereto by a suitable clamp. Attachment is by means of shackles and equalizer bars as known in the prior art. Likewise, vertical support cables 65 are attached to a shackle, or series of shackles, extending along the radius of truss 68. Truss 68 includes an internal support 68a. Shackle 79, the common attach point for torque cables 66 is displaced (radially offset) a radian distance r from the radial line of the truss 68 to provide lift at the desired torque.

FIG. 8 shows the orthogonal relation of the trusses 57, 68, 74, 75. Struts and diagonals are not shown. Depending on process requirements, the truss construction may be two long ones, 3 long ones, two long and two short, or one long and three short. The rake arms may be a round or square bar to minimize rake surface area being moved through the settled material. The respective rake arms have angled rake blades 77 which push against and move settled material toward the central withdrawal outlet 48.

FIG. 9 schematically shows pairs of support posts 71, 72 attached at 81 to the bottom chords of the drive trusses 31, 33, 43, 44 at equidistant points from the overall truss and thickener centerline. Each post extends to adjacent the bottom of the tankage with surface 71a above the tank bottom. The posts are stabilized by a series of cables or support rods 73 extending between adjacent ones of the pairs of rods top to bottom and vice-versa and to adjacent portions of the drive truss.

FIG. 10 shows the bottom of one post 71 on to which is hinged one of the rake arms 64 in two planes of rotation. An overall hinge joint 19 is provided including spaced hinge pintle sockets 82, 83 welded to the post and a rotary vertical cylinder 84 having pintles 85 at each end rotatable in and between the sockets 82, 83. The generally slightly sloped rake arm 64 includes a U-shaped yoke 87 with apertures 88 which allow rotation of the arm and yoke up and down about a horizontal pin 86 extending through cylinder 84. The arm and support posts are rotatable with the drive truss to which the support posts are connected. The rake arms may be raised and lowered about pin 86 and the angle of the rake arm rotatively adjusted about pintles 85.

The above description of embodiments of this invention is intended to be illustrative and not limiting. Other embodiments of this invention will be obvious to those skilled in the art in view of the above disclosure.

I claim:

1. A thickener comprising:
   a sedimentation tank having a bottom floor extending from a tank wall;
   at least one rotating truss extending radially across at least a portion of said tank to a position adjacent the center of said tank above a liquid level in said tank;
   drive means for rotationally driving said at least one rotating truss;
   at least one radial rake arm extending along said tank bottom from adjacent a center point of the tank bottom floor to a position approaching said tank wall;
   hinge means connected to an inner peripheral end of said rake arm for allowing upward pivoting movement of said rake arm;
   a support post extending from said hinge means to said at least one rotating truss; and
   a set of essentially vertical support cables, each of said set of cables extending from spaced radial positions on said at least one rake arm to support points on said at least one rotating truss, said support points being vertically above said at least one rake arm such that the net support cable load on said set of cables is essentially equal to the rake arm weight and essentially no thrust load is produced along said at least one rake arm.

2. The thickener of claim 1 further comprising a set of torque cables angularly connected to said at least one truss at a radially offset fixed point approximately halfway of the radius from the center of the tank to the outer periphery of said tank and to spaced points on said at least one rake arm such that the net cable load on said set of torque cables in operation produces essentially no thrust load along said at least one rake arm.

3. The thickener of claim 2 including four orthogonal rotatable trusses extending from the center of said tank, said trusses having sets of separate support and torque cables extending from positions on each of said trusses to spaced radial positions along four associated rake arms, said four rake arms being supported and rotated by said sets of support and torque cables.

4. The thickener of claim 2 further including tie rods extending between said at least one rotating truss and said hinge means for stabilizing said support posts.

5. The thickener of claim 4 in which said support posts and said tie rods are connected to inner radial ends of said at least one rotating truss.

6. The thickener of claim 1 further including tie rods extending between said at least one rotating truss and said hinge means for stabilizing said support posts.

7. The thickener of claim 6 in which said support posts and said tie rods are connected to inner radial ends of said at least one rotating truss.

8. The thickener of claim 1 in which said tank bottom floor is inversely coned.

9. The thickener of claim 1 wherein said at least one rotating truss comprises a single rotating truss extending over a full radius of said tank and a single auxiliary rotating truss extending on the same diametrical axis as said single rotating truss over an approximate half radius of said tank from the center of said tank.

10. The thickener of claim 1 wherein said at least one rotating truss comprises a pair of diametrically opposite rotating trusses extending over a full radius of said tank and a pair of diametrically opposite auxiliary rotating trusses extending orthogonally over an approximate half radius of said tank from the center of said tank. half radius of said tank from the center of said tank.

11. The thickener of claim 1 in which said drive means is a traction drive contacting an outer end of one of said at least one rotating truss.

12. The thickener of claim 1 in which said drive means is located in the center of said tank and rotates inner ends of said at least one truss.

13. The thickener of claim 1 further comprising at least one set of torque cables extending from a single point on at least one of said at least one truss from a point radially offset from said at least one truss support points to spaced points along an associated rake arm such that upon torquing of said rake arm by torque cable pull the net cable load on said set of torque cables produces essentially no thrust load along said rake arm to said hinge means.

14. The thickener of claim 13 in which sets of support and sets of torque cables extend from radially displaced single points on each of said at least one truss to spaced positions along associated rake arms.

15. The thickener of claim 1 in which said support cables extend vertically in an essentially vertical plane from said at least one rotating truss to said positions along an associated rake arm.

* * * * *

UNITED STATES PATENT AND TRADEMARK OFFICE
CERTIFICATE OF CORRECTION

PATENT NO. : 4,751,002
DATED : June 14, 1988
INVENTOR(S) : Donald L. King

It is certified that error appears in the above-identified patent and that said Letters Patent is hereby corrected as shown below:

Column 8, line 2-3, delete "half radius of said tank from the center of said tank".

Signed and Sealed this

Fourteenth Day of February, 1989

Attest:

DONALD J. QUIGG

Attesting Officer

Commissioner of Patents and Trademarks